United States Patent [19]
Blee et al.

[11] 3,759,344
[45] Sept. 18, 1973

[54] SYSTEMS FOR LAND VEHICLES

[75] Inventors: Timothy John Blee; Lawrence Edward Hyde; John Noddings, all of Warwickshire, England

[73] Assignee: Associated Engineering Limited, Warwickshire, England

[22] Filed: Feb. 25, 1971

[21] Appl. No.: 118,609

[52] U.S. Cl................. 180/105 E, 74/866, 74/864, 74/752 D
[51] Int. Cl. .......................................... G05d 13/62
[58] Field of Search ....................... 180/105, 105 E; 74/866, 865, 867, DIG. 1, 864; 123/32 EA

[56] References Cited
UNITED STATES PATENTS

| | | | |
|---|---|---|---|
| 3,680,411 | 8/1972 | Ito et al. ............................... | 74/866 |
| 3,324,738 | 6/1967 | Olsen et al............................ | 74/864 |
| 3,433,101 | 3/1969 | Scholl et al........................... | 74/866 |
| 3,575,147 | 4/1971 | Harrison et al................. | 123/32 EA |
| 3,406,775 | 10/1968 | Magnuski........................ | 180/105 R |
| 3,052,134 | 9/1962 | Worster................................ | 74/866 |
| 3,460,406 | 8/1969 | Strohm et al. .................. | 180/105 X |

Primary Examiner—Kenneth H. Betts
Attorney—Holcombe, Wetherill & Brisebois

[57] ABSTRACT

The invention relates to a land vehicle, and in particular to an automatic transmission for an automobile or other road vehicle. An electronic system is provided which senses the vehicle road speed and the torque of the vehicle engine, compares electrical signals corresponding to these variables, and controls changes in gear ratios of the transmission in dependence upon this comparison.

3 Claims, 3 Drawing Figures

Patented Sept. 18, 1973 3,759,344

SYSTEMS FOR LAND VEHICLES

This invention relates to land vehicles.

The present invention consists in a land vehicle having a prime mover, driving wheels and a variable-ratio drive interconnecting the prime mover and the driving wheels, and including means to derive a first electrical signal representative of the forward speed of the vehicle, means to derive a second electrical signal representative of the torque of the prime mover, and comparator means to compare the first and second electrical signals, the output of said comparator means being used to control the change of ratio of the variable-ratio drive. Thus, the driving wheels will rotate at a higher speed relative to the speed of rotation of the prime mover, when the vehicle is travelling at a higher forward speed, and vice versa.

The comparator means may include at least one operational amplifier to compare the first and second electrical signals, the output of said comparator being applied to electro-mechanical actuator means operable to change the ratio of the variable-ratio drive.

The prime mover may be an internal combustion engine having an induction manifold, in which event the second electrical signal representative of the torque may conveniently be derived from the induction manifold pressure via a pressure transducer connected to the induction manifold. In this case the induction manifold pressure can be measured as an absolute pressure, or alternatively as the depression of manifold pressure below ambient pressure.

The vehicle may include a speed indicator arranged to be fed by the first electrical signal. The first electrical signal may also be fed to a distance recording instrument of the vehicle.

An embodiment of the invention is described, by way of example only, with reference to the accompanying drawings, of which:

Figure 1:
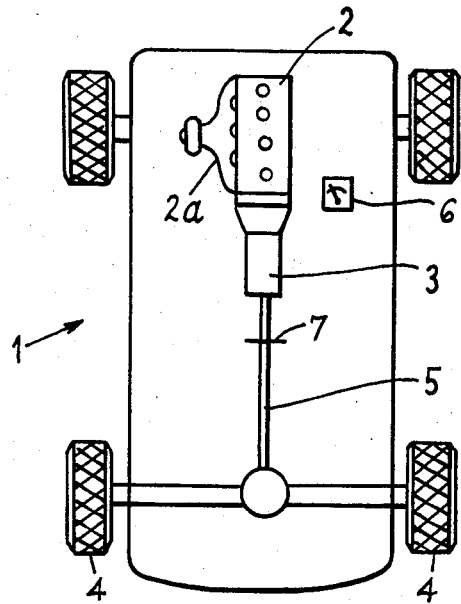
FIG. 1 is a schematic plan view of a road vehicle.

Referring to FIG. 1, a road vehicle 1, for example an automobile, includes a prime mover 2 such as an internal combustion engine, connected to road wheels 4 via a variable-ratio drive 3, namely an automatic transmission or gearbox, and a propeller shaft 5. The vehicle is also fitted with a speedometer and mileage recorder 6. The electronic system shown in FIG. 2 senses the speed of the vehicle shown in FIG. 1, and provides inputs representative of this speed for the control of the automatic transmission or gearbox, and for the speedometer and mileage recorder. For convenience the system will be described under a number of headings corresponding to these functions.

Vehicle Speed Sensing

A toothed disc 7 attached to the vehicle propeller shaft 5 induces a semi-sinusoidal waveform in a magnetic pick-up 8 arranged to be in close proximity to the teeth. The pick-up 8 is connected via a limiter network 9 to the input of a monostable circuit 10 which produces a constant width constant amplitude pulse for each cycle of the pick-up waveform. The pulse width may be pre-set by adjustment of the CR network 11. As the road speed increases so does the pulse repetition frequency of the monostable output. An averaging circuit 12 smoothes the monostable pulse train to produce a d.c. level which is proportional to road speed. This d.c. level is designated $V_{road}$ and is used as the actuating voltage for the various parts of the system.

Figure 3:
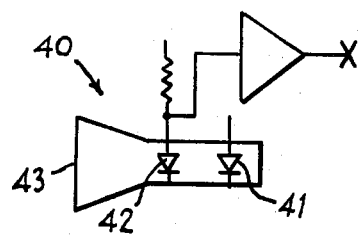
FIG. 3 is a diagram of an alternative pick-up arrangement to that shown in FIG. 2.
Figure 2:
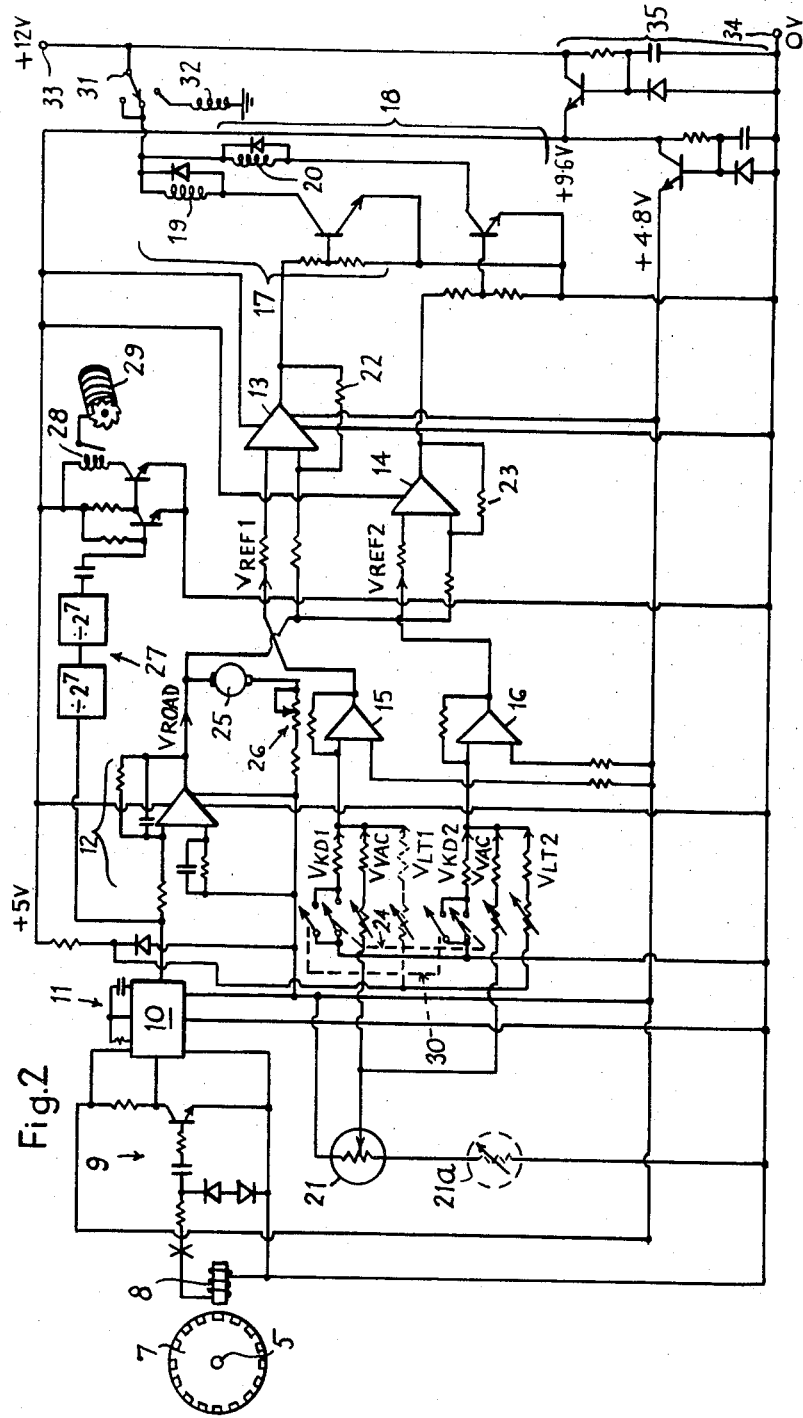
FIG. 2 is a diagram of an electrical system for the vehicle of FIG. 1.

An alternative speed-sensing arrangement, which may replace the disc 7 and pick-up 8 in FIGS. 1 and 2, is a semi-conductor radar 40 shown in FIG. 3, which operates directly from the road surface. This radar 40 conveniently includes a Gunn effect diode emitter 41, and a detector 42 which receives signals direct from the Gunn diode emitter 41 and reflected from the road surface. Emitter 41 and detector 42 are mounted in a wave-guide 43 directed downwardly at about 45° in the fore-and-aft direction of the vehicle.

Automatic Transmission Control $V_{road}$ is applied to the sensing inputs of two operational amplifiers 13, 14 arranged as comparators, and is compared, in each, with reference voltages $V_{ref\,1}$ and $V_{ref\,2}$ derived from operational amplifiers 15, 16 arranged as two adding circuits. The outputs of the operational amplifier comparators 13 and 14 are connected, respectively, to circuits 17 and 18 which, in turn include slugged solenoids 19 and 20 of electromagnetic actuators driving hydraulic servo-valves (not shown) which apply hydraulic pressure to the brake bands or clutches of a three speed epicyclic gear box. An output from comparator 13 will cause solenoid 19 to effect a change from first to second gear. An output from the other comparator 14 will cause solenoid 20 to effect a change from second to third gear.

The reference voltages $V_{ref\,1}$ and $V_{ref\,2}$, are controlled by engine manifold absolute pressure, which is proportional to engine loading, by means of a transducer illustrated schematically at 21. This transducer 21, which is connected into the engine induction manifold 2a (FIG. 1), includes a potentiometer driven by a pressure capsule. If low vehicle accelerations are required engine loading is low and manifold pressure is low resulting in low values of reference voltage. Gear changes under these conditions will occur at low engine and road speeds. If high vehicle accelerations are required engine loading is correspondingly higher, and manifold pressure is higher resulting in higher values of reference voltage. Gear changes under these conditions will occur at correspondingly higher values of engine and road speed.

To give a comparator output, and therefore effect a gear change, $V_{road}$ must exceed the reference voltage at the input of the appropriate comparator 13 or 14. The operational amplifier adding circuits 15, 16 are designed so that $V_{ref\,2}$ is always higher than $V_{ref\,1}$, therefore comparator 13 operates before comparator 14 to give sequential gear changes 1st to 2nd to 3rd with increasing road speed. If the throttle is closed and the vehicle is braked to reduce speed, sequential gear changes 3rd to 2nd to 1st will occur, but at lower speeds than those to change up, due to the low manifold pressure on the overrun. To prevent "hunting" and too frequent gear changes due to small changes of throttle opening at constant speed, or small changes in speed at constant throttle opening, hysteresis is provided by resistors 22, 23 shunting the comparator operational amplifiers 13, 14 respectively.

The values of $V_{ref\,1}$ and $V_{ref\,2}$ will vary linearly between the light throttle and full throttle values (as manifold pressure varies depending on engine power requirements) due to the variation of voltage $V_{vac}$ fed to the adding circuits from the manifold pressure transducer 21. The values of $V_{ref1}$ and $V_{ref2}$ for light throttle acceleration are determined by constant voltages $V_{LT1}$ and $V_{LT2}$ fed to the adding circuits. The values of $V_{ref1}$ and $V_{ref2}$ for full throttle acceleration are $V_{LT1}$ and $V_{vac}$ and $V_{LT2}$ and $V_{vac}$. A given value of $V_{vac}$ produces a greater output from adding circuit 15 than from adding circuit 16, to obtain suitable values of maximum reference voltage for full throttle acceleration.

A switch 24 is provided on the throttle control so that if the throttle is set in the wide open position, kick down maximum engine performance may be obtained. Under kick down conditions the engine speed is allowed to reach a higher speed such as that giving maximum power before changing to a higher gear. This engine speed multiplied by the gear ratios will give the kick down change up road speeds. As before $V_{ref1}$ and $V_{ref2}$ are equal to the values of $V_{road}$ at these speeds. The switch 24 feeds extra voltages $V_{KD1}$ and $V_{KD2}$ into the adding circuits 15, 16 so raising $V_{ref1}$ and $V_{ref2}$ to the required levels.

In some operating conditions, such as climbing mounting roads, the use of manifold absolute pressure may provide a disadvantage in that, at high altitude with low ambient pressure, the engine torque will be reduced and the gear change up speeds will also be reduced, resulting in a double reduction in vehicle performance. If, on the other hand, torque is sensed as a function of depression of manifold pressure below ambient pressure, at full throttle the depression will be substantially zero at all ambient pressures, so that the gear change-up speeds will be independent of ambient pressure. Therefore, the transducer 21 may advantageously be designed to compensate for changes in ambient pressure, or, if preferred, an extra pressure capsule 21a sensitive to ambient pressure can be arranged to operate a potentiometer which is included in the circuit where it will raise the change-up speeds as ambient pressure falls to compensate somewhat for the fall in engine torque, provided that the engine is not overspeeded.

To cushion the engagement of the transmission bands and clutches at low engine torques, whilst providing adequate grip at high torques, it is common to reduce the transmission fluid operating pressure at low engine torques. This may conveniently be done by feeding manifold pressure to a capsule connected in a suitable manner to the usual pressure relief and control valve in the transmission fluid supply system.

Electronic Speed Indication and Mileage Log $V_{road}$ is applied to a moving coil meter 25 via suitable scaling resistors 26. The meter is calibrated in any suitable units e.g. m.p.h. or k.p.h., and is used as the vehicle speed indicator.

The output of the monostable circuit 10 is connected to a binary divider circuit 27. The divider produces one ouput pulse per 1/10 of a mile travelled. This output pulse actuates a solenoid 28 which pulls round the 1/10 mile barrel of a conventional mechanical mileage recorder 29, via a ratchet mechanism.

Gear Selection

A main gear selector switch, shown at 30 and 31, is operable by the driver to select neutral, reverse and forward drive, in normal manner, reverse being selected via a solenoid 32 of an electromagnetic actuator. If required the switch 30, 31 may have other positions which feed voltages to the two adding circuits 15, 16 so as to i. raise $V_{ref2}$ to full voltage so that the second gear to third gear change is inhibited, and an automatic change occurs between first and second gears only, such as required for climbing steep winding roads.

ii. raise both $V_{ref1}$ and $V_{ref2}$ to full voltage so that only first gear is engaged.

The system shown in FIG. 2 is powered by the internal supply of the vehicle. The supply is applied to the connections 33, 34 which are connected to the input of a power supply circuit 35 which provides the necessary stabilised voltage inputs to the various stages of the system, irrespective of variations normally occurring in the internal supply voltage of the vehicle.

It will be understood that various modifications may be made without departing from the scope of the present invention as defined in the appended claims. For example, although in the embodiment of the invention specifically described, the transmission has three forward ratios, the invention is clearly applicable to transmissions having four or more ratios by addition of further sets of appropriate elements.

Furthermore, if preferred, the angle of movement of a suitable part of the throttle actuating mechanism may be used, instead of manifold pressure, as a measure of engine torque.

We claim:

1. In a land vehicle having an internal combustion engine provided with an induction manifold, driving wheels, and a variable-ratio drive interconnecting the engine and driving wheels, an electronic system to control the change of ratio of said variable-ratio drive in dependence upon the forward speed of the vehicle and the torque of the engine, said system including; means to sense the forward speed of the vehicle and produce a d.c. signal, the level of which is variable in dependence upon said forward speed; first and second operational amplifiers, each arranged as a comparator and each having a sensing input, a reference input, and an output, said d.c. signal being applied to the sensing inputs of both operational amplifiers; a pressure transducer connected to the induction manifold to sense the depression therein; circuit means connected to and controlled by said transducer, said circuit means including third and fourth operational amplifiers each arranged as an adding circuit and providing, respectively, first and second d.c. reference outputs, the instantaneous level of the first d.c. reference output being always lower than that of the second d.c. reference output, and the level of each reference ouput being variable in dependence upon the induction manifold depression sensed by said transducer, the first and second reference outputs being applied, respectively, to the reference inputs of the first and second operational amplifiers; a first output circuit, including a first actuator operable to effect a change in ratio of said variable-ratio drive between first predetermined ratio and a second and lower predetermined ratio, connected to and controlled by the output of the first operational amplifier; and a second output circuit, including a second actuator operable to effect a change ratio between said second ratio and a third and lower predetermined ratio, the first operational amplifier being arranged to produce an output when the level of said first d.c. signal exceeds that of the first d.c. reference output and thereupon to energise said first actuator to effect a change from said first to said second ratio, and the second operational amplifier being arranged to produce an output when the level of the said d.c. signal exceeds that of the second d.c. reference output and thereupon to energise said second actuator to effect a change from said second to said third ratio.

2. A land vehicle as claimed in claim 1, including means to increase said first and second reference outputs, independently of the inlet manifold depression, upon displacement of the engine throttle control to its fully open position, and wherein the first and second operational amplifiers are shunted by resistors to provide said amplifiers with a degree of hysteresis.

3. A land vehicle as claimed in claim 1, wherein said speed-sensing means comprises a sensing device adapted to produce an electrical output dependent upon said forward speed, said output being applied, via a limiter network, to the input of a monostable circuit which is adapted to produce a train of constant width constant amplitude pulses, the repetition rate of the pulses varying in dependence upon said output, the monostable pulse train output being smoothed by an averaging circuit to produce said d.c. signal which is applied to the sensing inputs of the first and second operational amplifiers, said sensing device being selected from the group consisting of: an electromagnetic pick-up arranged to sense the rotation of a member of said vehicle which rotates at a speed directly proportional to the road speed of said vehicle; and a semi-conductor radar device arranged to sense the displacement of the road surface relative to the vehicle, and wherein the output of the monostable circuit is also applied to a binary divider circuit arranged to produce one output pulse per predetermined unit of distance travelled by the vehicle, said output pulses being fed to a solenoid operable to actuate and advance in a stepwise manner, a mechanical mileage recorder.

* * * * *